United States Patent
Harms et al.

(10) Patent No.: US 8,798,904 B2
(45) Date of Patent: Aug. 5, 2014

(54) DEVICE AND METHOD FOR DETERMINING THE POSITION OF A ROAD ROLLER RELATIVE TO A ROAD FINISHER

(75) Inventors: Paul Harms, Steinbach (DE); Jochen Wendebaum, Elz (DE)

(73) Assignee: Moba-Mobile Automation AG, Elz (DE)

( * ) Notice: Subject to any disclaimer, the term of this patent is extended or adjusted under 35 U.S.C. 154(b) by 1761 days.

(21) Appl. No.: 11/740,148

(22) Filed: Apr. 25, 2007

(65) Prior Publication Data

US 2007/0255497 A1 Nov. 1, 2007

(30) Foreign Application Priority Data

Apr. 28, 2006 (DE) .................... 10 2006 019 841

(51) Int. Cl.
*E01C 19/00* (2006.01)
*E01C 19/23* (2006.01)
*E02D 3/026* (2006.01)
*G05D 1/02* (2006.01)

(52) U.S. Cl.
USPC .......................................... 701/300; 701/50

(58) Field of Classification Search
CPC .... E01C 19/004; E01C 19/006; G01S 13/876
USPC ......................................................... 701/300
See application file for complete search history.

(56) References Cited

U.S. PATENT DOCUMENTS

| | | | |
|---|---|---|---|
| 5,295,551 A | 3/1994 | Sukonick | |
| 5,942,679 A | 8/1999 | Sandstrom | |
| 6,188,942 B1 | 2/2001 | Corcoran et al. | |
| 6,371,566 B1 * | 4/2002 | Haehn | 299/1.5 |
| 2002/0044829 A1 * | 4/2002 | Rickards | 404/75 |
| 2006/0096354 A1 * | 5/2006 | Commuri et al. | 73/32 A |
| 2006/0229804 A1 * | 10/2006 | Schmidt et al. | 701/205 |
| 2009/0132165 A1 * | 5/2009 | Gabrielsson et al. | 701/300 |

FOREIGN PATENT DOCUMENTS

| | | |
|---|---|---|
| DE | 9313075 U1 | 12/1993 |
| DE | 69416006 T2 | 8/1999 |
| DE | 19951297 C1 | 4/2001 |
| DE | 10151942 A1 | 12/2002 |
| DE | 10317160 A1 | 11/2004 |
| EP | 0756653 B1 | 2/1997 |
| EP | 1708065 | 10/2006 |
| FR | 2707755 | 1/1995 |
| WO | WO 94/25680 | 11/1994 |
| WO | WO 2005/015257 | 2/2005 |

* cited by examiner

*Primary Examiner* — Khoi Tran
*Assistant Examiner* — Dale Moyer
(74) *Attorney, Agent, or Firm* — Michael A. Glenn; Perkins Coie LLP

(57) ABSTRACT

A device for determining the position of a road roller relative to a road finisher has a transceiver on the road roller for transmitting transmit signals and for receiving receive signals from at least two reference points on the road finisher spaced apart from each other. An evaluation unit determines the position of the road roller relative to the road finisher from the run time between transmitting the transmit signals and receiving the receive signals from the reference points.

16 Claims, 2 Drawing Sheets

DEVICE AND METHOD FOR DETERMINING THE POSITION OF A ROAD ROLLER RELATIVE TO A ROAD FINISHER

CROSS-REFERENCE TO RELATED APPLICATIONS

This application claims priority form German Patent Application No. 10 2006 019 841.7, which was filed on Apr. 28, 2006, and is incorporated herein by reference in its entirety.

TECHNICAL FIELD

The present invention relates to determining the position of a road roller relative to a road finisher.

BACKGROUND

It is important in road construction that the road surface applied by road finishers, such as, for example, asphalt material, is subsequently compacted by road rollers. For this, during operation one or several road rollers move in an area preset by one or several road finishers in which asphalt material has been deposited. Road rollers and road finishers form an operating unit and usually remain close to one another on the construction site.

In order to sufficiently compact the asphalt material, every region of the road is passed several times by a roller. The number of passings is of particular importance for the quality. In order to be able to determine the number of passings, the position of the road roller for different points in time is necessary. When the position and the speed of the road finisher are known, it is sufficient to determine the position of the road roller relative to the road finisher.

Determining the position of a mobile object by means of transponders at fixed locations of known positions is described in WO-A-2005/015257 and a determination of the number of times the roller passes over road sections is given in U.S. Pat. No. 5,942,679.

SUMMARY

According to an embodiment, a device for determining the position of a road roller relative to a road finisher may have: a transceiver mounted to the road roller for transmitting transmit signals and for receiving receive signals caused by the transmit signal from at least two reference points spaced apart from each other on the road finisher; and an evaluation unit for determining the position of the road roller relative to the road finisher based on a run time between transmitting the transmit signal and receiving a first receive signal from the first reference point and a run time between transmitting the transmit signal and receiving a second receive signal from the second reference point.

According to another embodiment, an embodiment may have a road roller having a device as mentioned above.

According to another embodiment, a method for determining the position of a road roller relative to a road finisher may have the steps of: transmitting transmit signals from the road roller to at least two reference points mounted to the road finisher; receiving a first receive signal caused by the transmit signal from a first reference point on the road finisher; receiving a second receive signal caused by the transmit signal from a second reference point on the road finisher; and determining the position of the road roller relative to the road finisher based on a run time between transmitting the transmit signal and receiving the first receive signal and a run time between transmitting the transmit signal and receiving the second receive signal.

According to another embodiment, a method for constructing a road may have the steps of: depositing a road surface by a road finisher; and compacting the road surface by a road roller using a method as mentioned above.

According to another embodiment, an embodiment may have a computer program having program code for performing the method for determining the position of a road roller relative to a road finisher as mentioned above when the computer program runs on a computer.

The central idea of embodiments of the present invention is determining the position of the road roller relative to the road finisher at any given point in time by means of run-time measurements of radio signals. The number of times the road roller passes over sections of a road surface can be determined by means of a corresponding evaluation unit. At the same time, the speed of the road roller and/or the road finisher can also be determined. Determining the position is, thus, used for monitoring quality of the rolling work done.

Advantageously, a radio signal is transmitted by a transceiver on the road roller, which is responded to by at least two spatially separate transponders on the road finisher such that every response received can be associated to the respective transponder. The run time of each signal is determined in the transceiver and the distance of every transponder from the transceiver and, thus, from the road roller, is determined. The position of the transceiver is calculated by means of the distance information obtained.

In order to determine the position of the road roller relative to the road finisher, one or several distance measurements relative to the road finisher are executed such that the distance from the road roller to several transponders, such as, for example, the left and right sides of the road finisher, can be measured. The distances from the road roller to the road finisher and from the road roller to the edge of the range of application can be calculated by means of two measurements to the sides of the road finisher when the edge of the range of application matches the edge of the road finisher.

In addition, further transponders may be attached to the road finisher, but also to other road rollers, to any other construction machine or construction site equipment, to other points in the ground or to persons. This allows determining the absolute position and the quality of the position determined is improved. Additionally, distance measurements relative to further reference points may be performed in order to avoid dangerous situations due to collisions and dangerous approaches based thereon.

Also, it is possible by means of the measurements performed to determine the drive speed of the road finisher by performing several successive measurements from the road roller to the road finisher and calculating the speed as follows:

$$\Delta v = \frac{\Delta s}{\Delta t}$$

$\Delta s$ being the difference in distance measurements and $\Delta t$ being the distance in time of the measurements, $\Delta v$ being the speed difference between the road finisher and the road roller. In order to determine the road finisher speed, the road roller speed $v_w$, is to be added to $\Delta v$. Another way of determining the speed difference is measuring the Doppler effect of the measuring signal received, i.e. measuring the frequency shift as a consequence of the relative speed of the road roller relative to the road finisher.

Embodiments of the present invention are not limited to a roller and a finisher. Rather, several rollers may employ the inventive concept simultaneously and independently of one another in order to be able to determine the positions thereof relative to one or relative to several finishers. For this purpose, each roller may comprise a corresponding transceiver and a corresponding evaluation unit.

BRIEF DESCRIPTION OF THE DRAWINGS

Embodiments of the present invention will be detailed subsequently referring to the appended drawings, in which.

DETAILED DESCRIPTION

Figure 1:
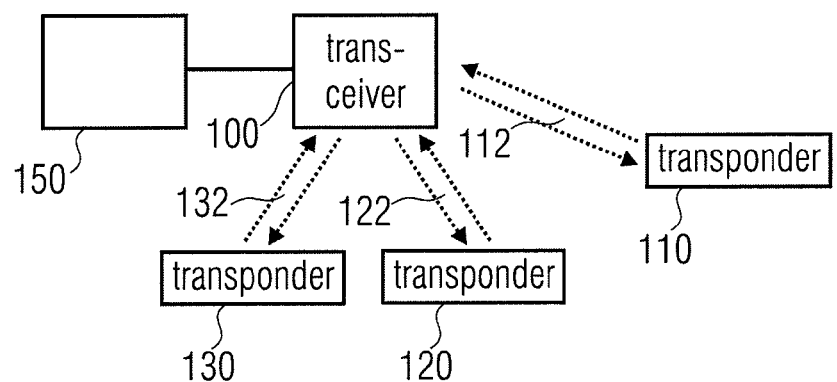
FIG. 1 is a schematic illustration for a run-time measurement of radio signals using a transceiver and three transponders.

FIG. 1 shows how a transceiver 100 with which the road roller is equipped emits radio signals responded to by transponders 110, 120 and 130. The response of the transponder is designed such that the transceiver 100 can unambiguously associate the response signals to the transponders, i.e. transponder 110 transmits a response signal 112, transponder 120 transmits a response signal 122 and transponder 130 transmits a response signal 132. The transponders may, for example, transmit response signals comprising a transponder-specific identification, such as, for example, a specific frequency or phase shift, in the response signal. The transceiver 100 detects the time between transmitting the transmit signal and receiving the transponder-specific response signal for every transponder and passes on the run times referring to the individual transponders to the evaluation unit 150 which calculates the distance from the transceiver 100 to the individual transponders from this.

Figure 2:
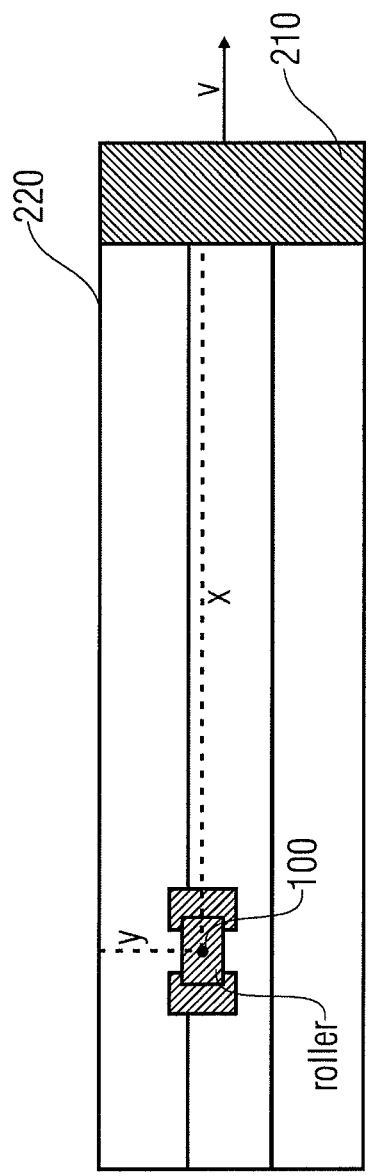
FIG. 2 is a top view of a road roller behind a road finisher (and/or a finisher board) including compaction paths.

FIG. 2 is a schematic illustration of how the road roller, including the transceiver 100, follows a road finisher 210 in a distance x. The distance from the road roller 100 to the outer edge 220, which is preset by the road finisher 210, is referred to by y. The road finisher 210 thus moves with a speed v and the relative position of the road roller 100 given by the values x and y changes over time should the road roller speed $v_w$ not match the speed v of the road finisher 210.

Figure 3:
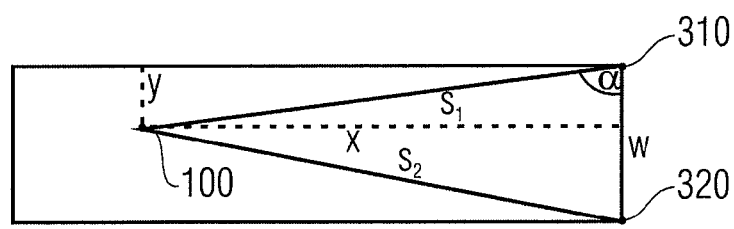
FIG. 3 is an illustration of the geometrical parameters for determining the position of a road roller.

FIG. 3 illustrates the geometrical parameters relevant for determining the values x and y from the distances from the road roller 100 to the edge points 310 and 320 of the road finisher 210. Thus, it is assumed that a transponder is attached to the right edge 320 and a transponder is attached to the left edge 310 of the road finisher 210 and that the transponders are in a distance w to each other. The distance from the road roller 100 to the left edge 310 of the road finisher 210 is identified by $s_1$ and the distance to the right edge 320 is identified by $s_2$. The angle spanned at the left edge 310 between the road finisher 210 and the connective line to the road roller 100 is referred to by α. The results of the distance measurement described above are the values $s_1$ and $s_2$. Since, additionally, the value w is known, at first the auxiliary values s and r are formed as follows:

$$s = \frac{s_1 + s_2 + w}{2}, r = \sqrt{\frac{(s-s_1)(s-s_2)(s-w)}{s}}$$

and, thus, the angle α is determined from the following equation:

$$\tan\frac{\alpha}{2} = \frac{r}{s - s_2}$$

Finally, x and y are calculated from the following relations:

$$x = s_1 \sin\alpha \text{ and } y = s_1 \sin(90° - \alpha)$$

This determination of position is updated continuously, i.e. continuously repeated in a regular or irregular interval. From the change in position during this interval, the evaluation unit 150 calculates the speed $v_w$ of the road roller 100 relative to the road finisher 210 according to the above formula or, when considering the speed of the road roller, the absolute speed v of the road finisher 210. The absolute speed may then be used when determining the absolute position of the road roller.

In another embodiment, the speed difference between the road roller 100 and the road finisher 210 may be determined using the Doppler effect, i.e. using the frequency difference between the signal emitted and the signal received.

In yet another embodiment, one or several further transponders are positioned at any points outside the road finisher 210. These points may be on other road finishers, on other road rollers, on other construction machines or on construction site equipment. However, transponders may also be mounted to other points in the ground or to persons. These additional transponders may also be employed for measuring distances to thus improve the determination of position (such as, for example, by averaging the values obtained) and/or ensure the determination of position even if a transponder at the edge point 310 or 320 fails or is hidden. In addition, the additional transponders may also be used for timely recognizing dangerous situations and, thus, for avoiding accidents. In particular, when mounted to unmoved objects, these additional transponders offer a way of being able to determine not only the relative speed of the road finisher 210 and the road roller 100, but also to directly determine the absolute speed thereof.

From the position data obtained and the absolute speed v of the road finisher 210, the evaluation unit 150 can determine precisely how many times the road roller 100 has passed a certain road section. An embodiment of how this may take place is described below.

The determination of position is continuously repeated in a distance of time Δt of, for example, one second. In this time section, the absolute position changes along the x direction by: $\Delta x^{abs} = \Delta x + v \Delta t$, wherein Δx being the difference of the x values from the measurements in the distance of time Δt and the speed v of the finisher in this embodiment is assumed to be constant. Since, in the exemplary case, the road finisher 210 does not move along the y direction, the following applies: $\Delta y^{abs} = \Delta y$, i.e. there is no correction for the y values as a consequence of the road finisher moving. The absolute positions are detected continuously by the evaluation unit 150 in the distance of time Δt. In addition, in the evaluation unit 150, the road is divided into sections the length and width of which exemplary correspond to the distance which the road roller 100 travels with the optimum road roller speed in Δt, i.e. in the example chosen here in one second.

Counting the passings may take place as follows. The evaluation unit associates a value incremented by one with each passing to all sectors. The evaluation unit 150, thus, detects all the sectors passed simultaneously, i.e. the width of the road roller 100 is taken into consideration.

These values may be displayed to the driver of the road roller 100 via a screen representing the road with its sectors. In another embodiment, every passing of a sector may result in a change in color of the corresponding sector on the screen. An advantage of this embodiment is that when the optimum speed of the road roller 100 is exceeded or fallen below, this becomes visible on the screen sectors being skipped or counted twice. This incorrect counting is corrected by the evaluation unit 160 and, additionally, the driver of the road roller 100 is informed, so that he/she can correct the speed.

For quality assurance, the driver is directly signaled how many times which road section has to be passed by the road roller 100. Since this is independent of subjective feelings of the driver, the inventive concept offers great an advantage.

Another advantage is avoiding superfluous passings, being a cost-advantage when constructing the road. In addition, in further embodiments, additional transponders may be mounted to further reference points, so that the distance and the relative speed to these points may be determined. This is of particular advantage to avoid dangerous approaches and collisions relative to, for example, persons and/or other construction site equipment. Apart from cost-savings while maintaining quality assurance, the inventive concept also offers advantages for improving work safety on construction sites.

It is particularly pointed out that depending on the circumstances the inventive concept may also be implemented in software. The implementation may be on a digital storage medium, in particular on a disk or a CD having control signals which may be read out electronically which can co-operate with a programmable computer system such that the corresponding method will be executed. Generally, the invention, thus, also includes a computer program product having program code stored on a machine-readable carrier for performing the inventive method when the computer program product runs on a computer. Put differently, the invention may also be realized as a computer program having a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for determining the position of a road roller relative to a road finisher, comprising:
   a transceiver mounted to the road roller for transmitting transmit signals and for receiving receive signals caused by the transmit signal from at least two reference points spaced apart from each other on the road finisher;
   an evaluation unit for determining the position of the road roller relative to the road finisher based on a run time between transmitting the transmit signal and receiving a first receive signal from the first reference point and a run time between transmitting the transmit signal and receiving a second receive signal from the second reference point; and
   a determiner for determining the number of times the road roller has passed over a section of the road surface deposited by the road finisher using the positions of the road roller determined over time.

2. The device according to claim 1, wherein the first receive signal comprises a first identification and the second receive signal comprises a second identification.

3. The device according to claim 1, wherein the reference points comprise transponders.

4. The device according to claim 1, further comprising a determiner for determining a speed difference between the road roller and the road finisher.

5. The device according to claim 4, further comprising a determiner for determining an absolute speed of the road finisher on the basis of the speed difference and an absolute speed of the road roller.

6. The device according to claim 1, further comprising a determiner for determining a speed difference between the road roller and the road finisher based on the Doppler effect.

7. The device according to claim 1, being further implemented to receive further receive signals from further reference points and to determine the distance to further objects based thereon.

8. A road roller comprising a device for determining the position of a road roller relative to a road finisher, comprising:
   a transceiver mounted to the road roller for transmitting transmit signals and for receiving receive signals caused by the transmit signal from at least two reference points spaced apart from each other on the road finisher;
   an evaluation unit for determining the position of the road roller relative to the road finisher based on a run time between transmitting the transmit signal and receiving a first receive signal from the first reference point and a run time between transmitting the transmit signal and receiving a second receive signal from the second reference point; and
   a determining unit for determining the number of times the road roller has passed over a section of the road surface deposited by the road finisher using the positions of the road roller determined over time.

9. A method for determining the position of a road roller relative to a road finisher, comprising:
   transmitting transmit signals from the road roller to at least two reference points mounted to the road finisher;
   receiving a first receive signal caused by the transmit signal from a first reference point on the road finisher;
   receiving a second receive signal caused by the transmit signal from a second reference point on the road finisher;
   determining, using a computer, the position of the road roller relative to the road finisher based on a run time between transmitting the transmit signal and receiving the first receive signal and a run time between transmitting the transmit signal and receiving the second receive signal; and
   determining the number of times the road roller has passed over a section of the road surface deposited by the road finisher using the positions of the road roller determined over time.

10. The method according to claim 9, wherein the first receive signal comprises a first identification and the second receive signal comprises a second identification.

11. The method according to claim 9, further comprising the following step:
    determining a speed difference between the road roller and the road finisher.

12. The method according to claim 11, further comprising the following step:

determining an absolute speed of the road finisher on the basis of the speed difference and an absolute speed of the road roller.

13. The method according to claim 9, further comprising the following step:
 determining the speed difference between the road roller and the road finisher based on the Doppler effect.

14. The method according to claim 9, further comprising the following step:
 receiving further receive signals from further reference points and, based thereon, determining the distance to further objects.

15. A method for constructing a road, comprising:
 depositing a road surface by a road finisher; and
 compacting the road surface by a road roller using a method for determining the position of a road roller relative to a road finisher, comprising:
  transmitting transmit signals from the road roller to at least two reference points mounted to the road finisher;
  receiving a first receive signal caused by the transmit signal from a first reference point on the road finisher;
  receiving a second receive signal caused by the transmit signal from a second reference point on the road finisher;
  determining the position of the road roller relative to the road finisher based on a run time between transmitting the transmit signal and receiving the first receive signal and a run time between transmitting the transmit signal and receiving the second receive signal; and
  determining the number of times the road roller has passed over a section of the road surface deposited by the road finisher using the positions of the road roller determined over time.

16. A non-transitory computer readable storage medium comprising program code for performing a method for determining the position of a road roller relative to a road finisher, comprising:
 transmitting transmit signals from the road roller to at least two reference points mounted to the road finisher;
 receiving a first receive signal caused by the transmit signal from a first reference point on the road finisher;
 receiving a second receive signal caused by the transmit signal from a second reference point on the road finisher;
 determining the position of the road roller relative to the road finisher based on a run time between transmitting the transmit signal and receiving the first receive signal and a run time between transmitting the transmit signal and receiving the second receive signal, when the computer program runs on a computer; and
 determining the number of times the road roller has passed over a section of the road surface deposited by the road finisher using the positions of the road roller determined over time.

* * * * *